United States Patent

[11] 3,584,204

[72] Inventor William C. Susor
    Oregon, Ohio
[21] Appl. No. 818,197
[22] Filed Apr. 21, 1969
[45] Patented June 8, 1971
[73] Assignee The Reliance Electric and Engineering Company
    Toledo, Ohio
    Continuation of application Ser. No. 492,040, Oct. 1, 1965, now abandoned.

[54] AUTOMATIC COMPUTING AND PRINTING SCALE HAVING PRICE-PER-WEIGHT UNIT AND PRICE-BY-QUANTITY MODES
7 Claims, 5 Drawing Figs.

[52] U.S. Cl. .................................................. 235/151.33,
    177/3
[51] Int. Cl. ................................................. G06f 15/20,
    G06f 11/08
[50] Field of Search ........................................ 235/151.33;
    177/3

[56] References Cited
UNITED STATES PATENTS

| | | | |
|---|---|---|---|
| 2,963,222 | 12/1960 | Allen | 235/151 |
| 3,205,956 | 11/1965 | Bell et al. | 235/151.33X |
| 3,276,526 | 10/1966 | Loshbough | 177/3 |
| 3,315,067 | 4/1967 | Bell et al. | 235/151.33 |
| 3,104,806 | 9/1963 | Allen | 235/58 |

Primary Examiner—Malcolm A. Morrison
Assistant Examiner—Edward J. Wise
Attorney—Thomas H. Grafton ABSTRACT: A computing and printing weighing scale system including a computer, means for entering a weight factor in the computer and means for entering a price-per-weight unit factor, e.g., $1.23 per pound, or a price-by-quantity figure, e.g., one bunch for 23 cents, in the computer. The computer produces electrical outputs in accordance with the product of the factors or in accordance with the figure. A programmer operable in a first mode programs the system to weigh and compute and print the product and operable in a second mode programs the system to produce the electrical output in accordance with the figure and print the figure.

AUTOMATIC COMPUTING AND PRINTING SCALE HAVING PRICE-PER-WEIGHT UNIT AND PRICE-BY-QUANTITY MODES

This is a continuation of U.S. Pat. application Ser. No. 492,040 which is now abandoned.

This invention relates to condition measuring and indication apparatus, such as systems for weighing, computing and printing a record of the weight and value of each of a plurality of successively weighed loads, and more particularly to controls for such apparatus.

The controls are particularly useful in conjunction with the weighing, computing and printing system shown and described in U.S. Pat. No. 3,384,193 issued May 21, 1968 in the names of W. C. Susor and O. J. Martin and in U.S. application Ser. No. 439,751 filed Mar. 15, 1965 in the name of W. C. Susor. In the system disclosed in such patent and application, commodities are weighed and printed tickets are issued each bearing the net weight, price per pound, and computed value of the weighed commodity together with such variable data as the date code, store or operator's code, commodity name, and commodity grade. The controls of the invention are incorporated in such system to provide optional price-by-quantity printing.

The objects of this invention are to provide new techniques for printing tickets, labels or the like in computing and printing weighing scale systems, to provide new controls for such systems, to improve such systems, to provide means for selectively blanking out data which ordinarily would be printed by such systems, to provide means in such systems for printing price per pound or price by quantity in which price entry is made in either case through the same price entry apparatus, to provide means in such systems for printing price per pound or price by quantity using in either case the existing circuitry disclosed in the above patent and application, and to print data, such as price by quantity, on tickets, labels or the like in such systems while not printing zeros in the usual weight and price per pound areas.

One embodiment of this invention enabling the realization of these objects is a circuit which is offered as an option with the system disclosed in the above patent and application; it includes controls which are moved by the operator to print price per pound in the usual way or to print price by quantity, such as three one-hundredths (3 pieces or 3 pounds for $1.00). In either case, the price is entered by the same price entry levers. When the controls are operated to print price by quantity, the circuit causes the regular price per pound and weight areas on the labels to be left blank and the price by quantity is printed in the regular computed value areas. Also, the controls can be operated to blank out computed value, weight or price per pound when labels are printed in the usual price-per-pound mode of operation.

In accordance with the above, one feature of this invention resides in entering price per pound or price by quantity into the system through the same price entry apparatus.

Another feature resides in using existing circuitry for either price per pound or price by quantity mode of operation.

Still another feature resides in leaving the regular price per pound and weight areas on the labels blank and printing the price by quantity in the regular computed value areas on the labels.

A further feature resides in selectively blanking out computed value or weight or price per pound when labels are printed in the usual price-per-pound mode of operation.

The above and other objects and features of this invention will be appreciated more fully from the following detailed description when read with reference to the accompanying drawings wherein.

Figure 1:
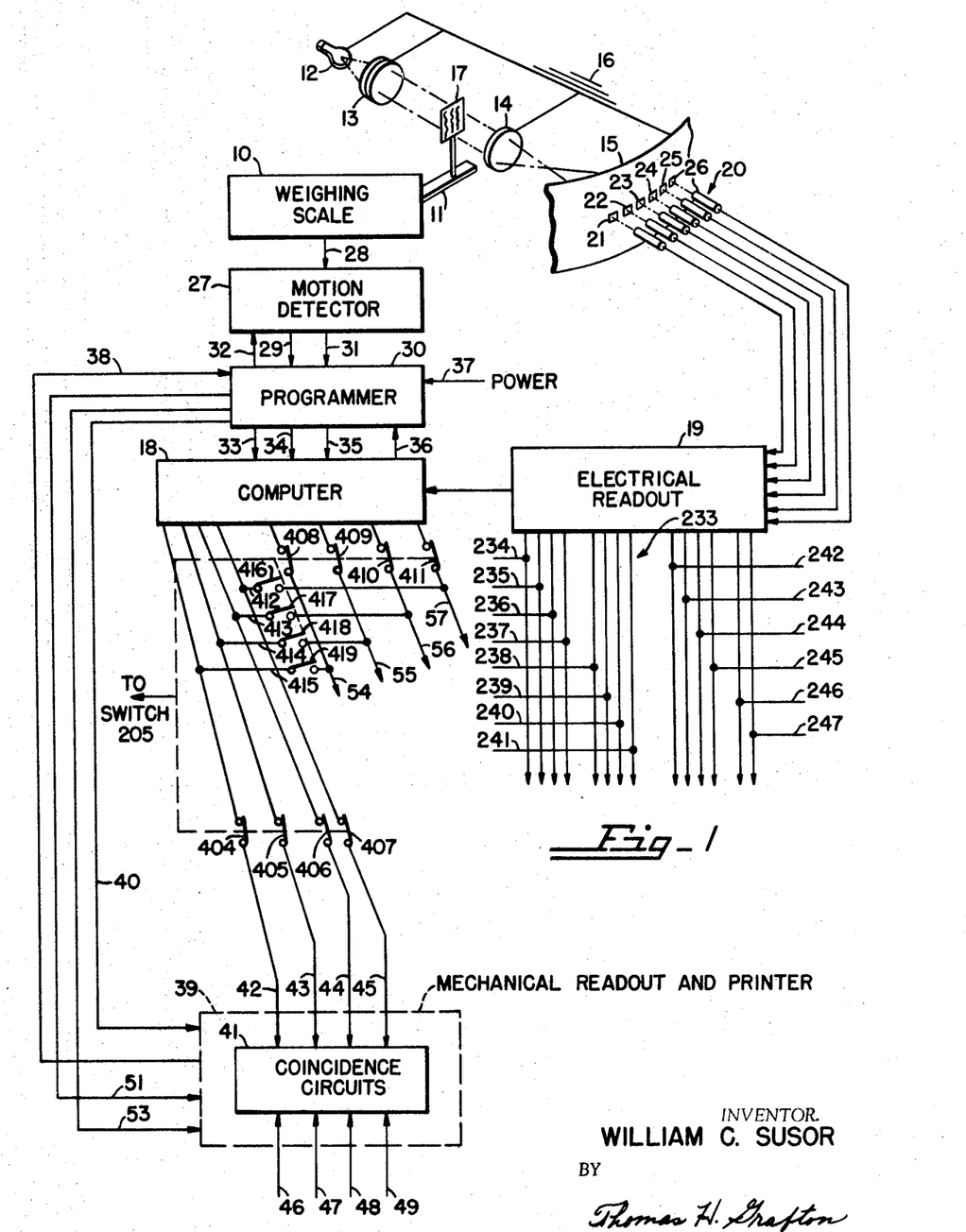
FIG. 1 is a schematic diagram illustrating the general organization of the weighing, computing and printing system.

Referring to FIG. 1, a computing weighing scale 10 includes a lever 11 and an optical projection system which diagrammatically includes a light source 12, a condensing lens 13, a projection lens 14 and a photocell mask 15. The light source 12, the lenses 13 and 14, and the mask 15 are connected to ground as shown at 16 (e.g., base of weighing scale), the mask 15 being rigidly mounted with respect to the projection optics. A coded chart 17 is moved by the load-responsive lever 11 in the optical projection system, the chart 17, hence, being condition responsive. A computer 18 which is disclosed in detail in the above U.S. application Ser. No. 439,751 receives weight information from the scale and multiplies the weight of an article upon the scale by the unit price of such article to compute the value of such article. The computer 18 also multiplies such unit price times one so that it can produce a unit price output. The computer 18 has a weight input which is compatible with the parallel 1—2—4—8 binary coded decimal output of an electrical readout 19 in circuit therewith.

The chart 17 has a matrix of coded markings arranged in vertical bands so that the relative position thereof may be read by a bank of readout photocells 20, with one cell being associated with each column, providing an indication of the weight upon the scale. The output of the photocells is applied to the electrical readout 19, which makes available weight information to the input of the computer 18. The mask 15 is shown as being slitted at 21—26 so that a small and clearly defined portion of the projected image of the chart 17 is permitted to fall on each of the sensitive grids of the photocells, i.e., the mask screens out unwanted chart bits (the projection lens 14 projects all of the bits in its field of view). There is a total of 14 photocells in the photocell bank 20, only six of the 14 photocells being shown for the sake of simplicity. Fourteen photocells are enough to read out a chart capacity of 25.00 pounds.

The weighing scale 10 is connected operatively to a motion detector 27 through a connection 28, the motion detector preventing erroneous weight readouts from taking place when the weighing mechanism is in motion. The motion detector 27 applies no motion signals through a lead 29 to a programmer 30 which is disclosed in detail in the above U.S. Pat. No. 3,384,193. The motion detector 27 also applies motion signals through a lead 31 to the programmer 30 and receives conditioning signals from the programmer 30 through a lead 32.

The programmer 30 applies reset signals and command to compute signals through leads 33, 34 and 35, respectively, to the computer 18 and receives program advance signals through a lead 36 from the computer 18. The programmer 30 also receives power on signals through a lead 37 and coincidence check signals through a lead 38. The coincidence check signals indicate that the computer 18 and the readout positions of the number wheels in a mechanical readout and printer 39 agree. The programmer 30 also applies a signal through a lead 40 to the mechanical readout and printer 39 commanding it to print.

As described in the above U.S. Pat. No. 3,384,193, the programmer 30 is used in conjunction with a mechanical readout which is disclosed in U.S. Pat. No. 3,416,151 issued Dec. 10, 1968 in the name of C. E. Adler. The readout includes a combination of a series of modules each comprising a detent wheel which is directly gear connected to a commutator and to a print wheel. Each module indicates the digits of a particular denominational order. When the turning print wheel approaches the correct indicating position, a stopping latch intercepts the correct one of the teeth of the detent wheel to arrest the detent wheel. Such readout also includes coincidence circuits 41 which receive 1—2—4—8 binary coded unit price signals from the computer 18 through leads 42—45 and 1—2—4—8 binary coded decimal signals through leads 46—49 indicative of the positions of the commutators. The detent wheels and thus the print wheels are stopped when the coincidence circuits determine that the wheels are in the correct indicating positions. The readout also includes a solenoid coil 350 (FIG. 5) which when it receives a signal through a lead 51 permits a new reading to be made and a solenoid coil 352

(FIG. 5) which when it receives a signal through a lead 53 unlocks the unit price indicating modules. Coil 350 corresponds to coil 50 and coil 352 corresponds to coil 52 shown in FIG. 2 in the above U.S. Pat. No. 3,384,193. Similarly, the coincidence circuits 41 receive 1—2—4—8 binary coded decimal computed value signals from the computer 18 through leads 54—57 and 1—2—4—8 binary coded decimal weight signals from the electrical readout 19 through the leads 233, and 1—2—4—8 binary coded decimal signals through leads not shown indicative of the positions of the commutators.

Although the various logic circuits mentioned herein are in common use in the electronic control field, a brief description of the function of each circuit is as follows. An AND logic circuit produces an output signal when, and only when, all of a plurality of input signals are present. A NOT logic circuit produces an output signal at all times unless an input signal is present. A MEMORY logic circuit sometimes known as a flip-flop or bistable circuit has "ON" and "OFF" or reset input terminals, and "ON" and "OFF" output terminals. The MEMORY or bistable circuit produces an "ON" output signal in response to a signal applied at the "ON" input terminal and continues to produce the "ON" output signal, even though the input signal at the "ON" input terminal is removed, until a signal is applied to the "OFF" input terminal. The MEMORY circuit will then be turned "OFF" and produce an "OFF" output signal even though the signal at the "OFF" input terminal is removed. The MEMORY circuit will revert to its initial state upon application of a signal to the "ON" input terminal. An OR logic circuit produces an output upon receiving an input signal at any of a plurality of input terminals. For further details on the construction and operation of various types of logic circuits reference is made to an article entitled "Static Switching Devices," by Robert A. Mathias, in *Control Engineering*, May 1957. All of the logic circuits mentioned hereinafter, such as gates and flip-flops, and the clock and diode matrix circuits are of conventional type. The connections between said circuits are clearly shown in the drawings and will not be described in detail.

Figure 2:
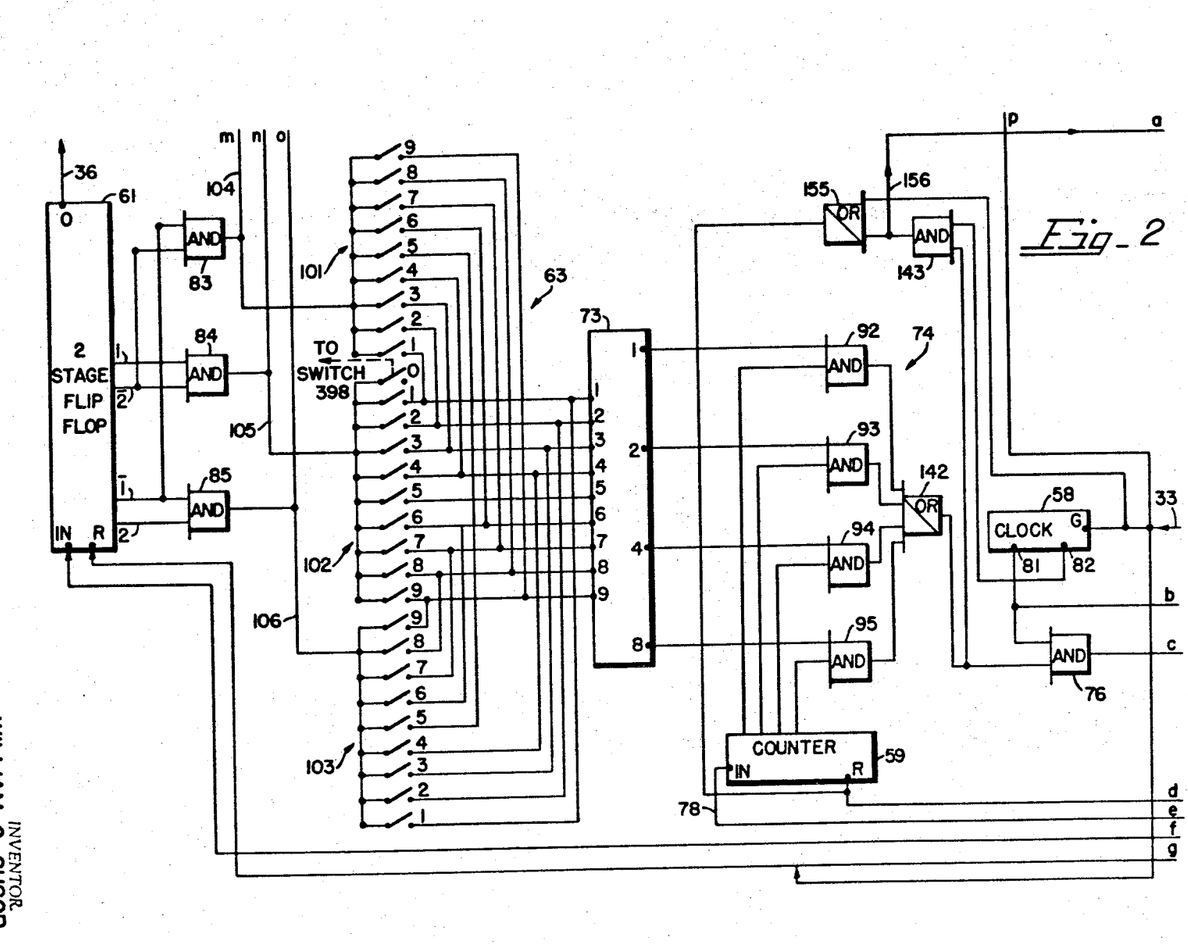
FIGS. 2, 3 and 4 are detailed block diagrams of the computer shown in FIG. 1.
Figure 3:
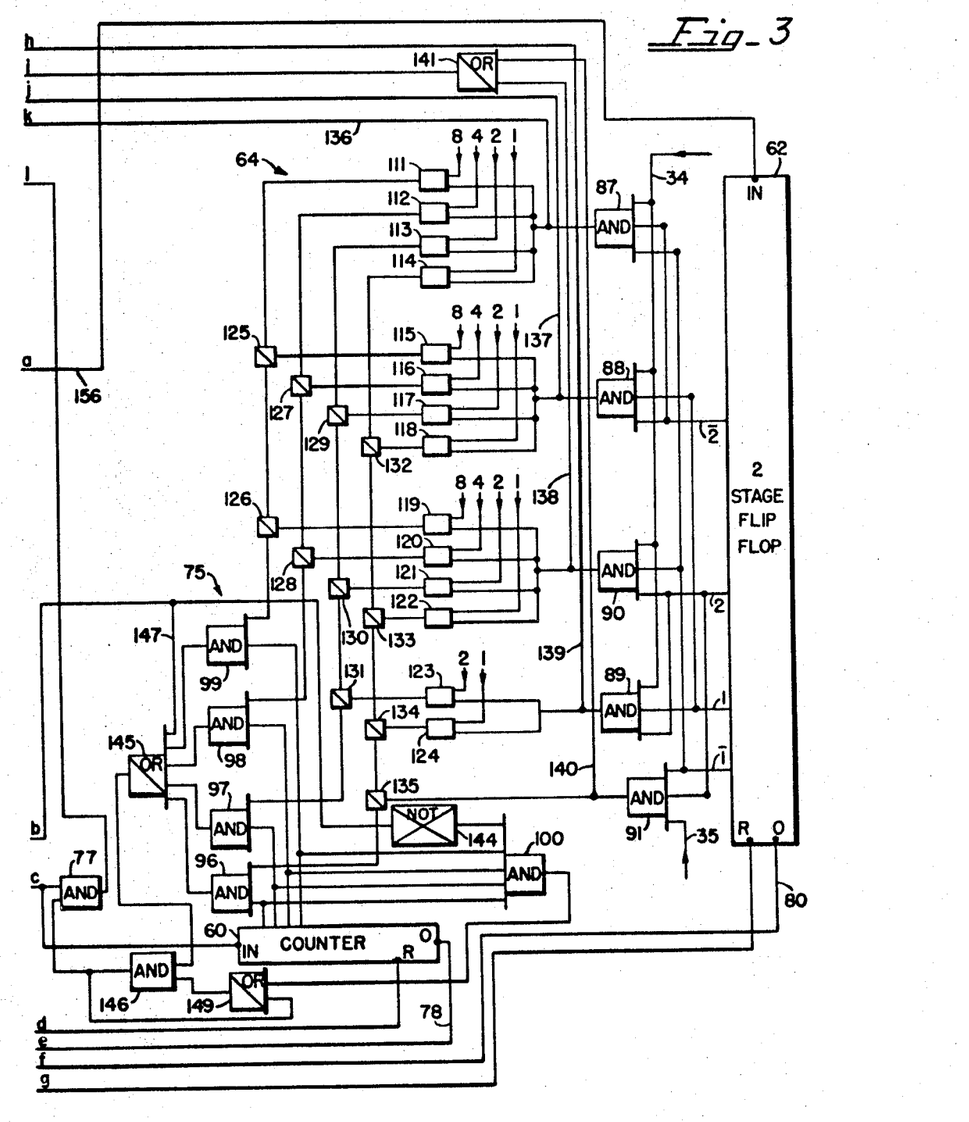
Figure 4:
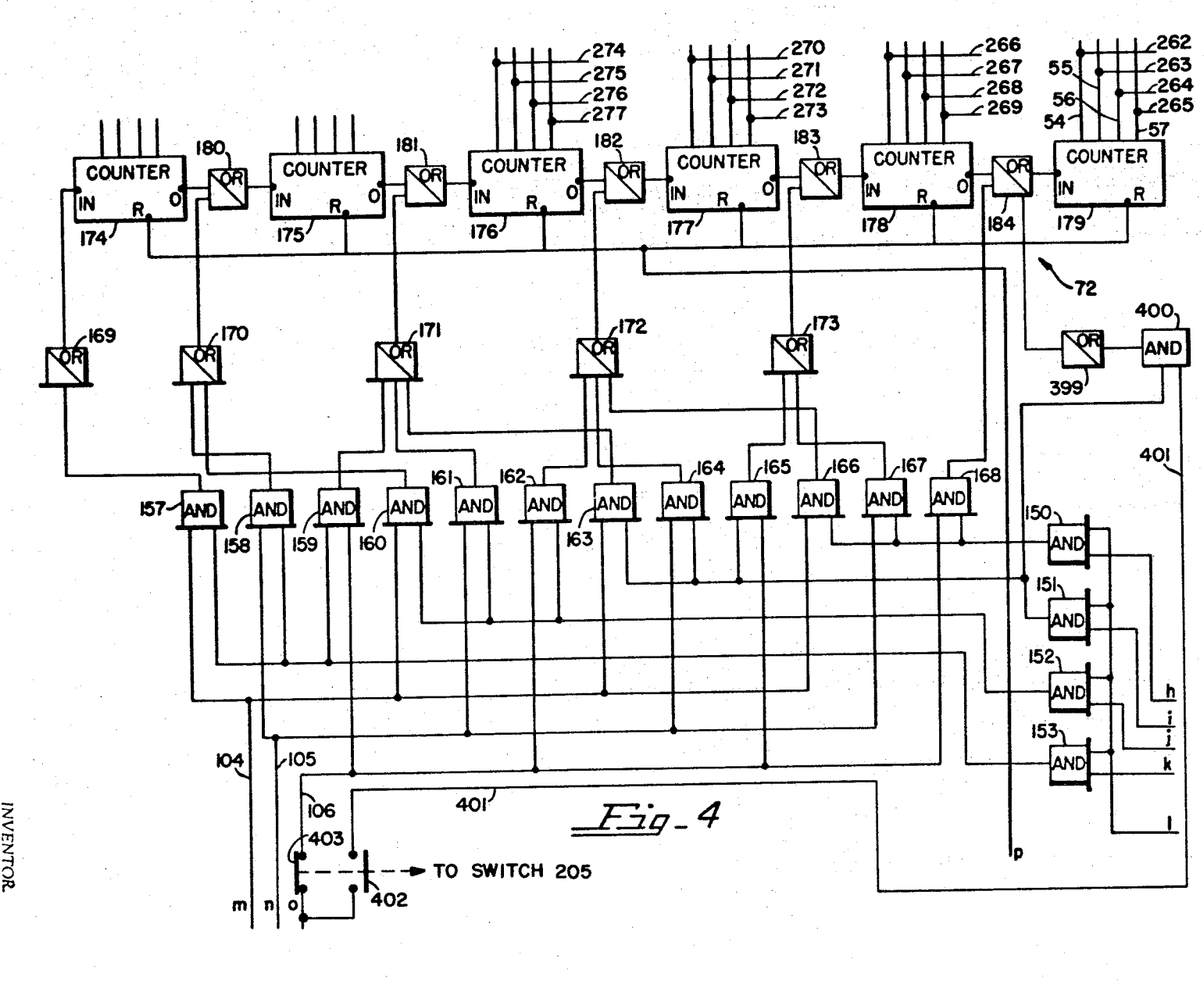

The computer 18 is shown in detailed block form in FIGS. 2, 3 and 4, FIG. 2 being connected to FIG. 3 at lead ends *a—g* and to FIG. 4 at lead ends *m—p* and FIG. 3 being connected to FIG. 4 at lead ends *h—l*.

The computer 18 includes a synchronized free running multivibrator or clock 58, which is gated on by a reset signal from the programmer 30 through the lead 33, a conventional 1—2—4—8 binary counter 59, a conventional 1—2—4—8 binary coded decimal counter 60, and two two-stage flip-flops 61 and 62 (bistable means), the counters 59 and 60, the two-stage flip-flops 61 and 62, and a register 72 being reset at the start of a cycle by the same reset signal from the programmer 30 through the lead 33 which gates on the clock 58. Price entry is made in a price circuit 63 (first factor entering means) by moving price knobs or levers as described in the above U.S. Pat. No. 3,384,193 and weight entry is made in a weight circuit 64 (second factor entering means) as described above, i.e., the parallel 1—2—4—8 binary coded decimal output of the electrical readout 19 (FIG. 1).

The two two-stage flip-flops 61 and 62 each is identical to the two-stage flip-flop shown in detail in FIG. 4 of the above U.S. Pat. No. 3,384,193. The counters 59 and 60 each contain two of such two-stage flip-flops, i.e., each of the two-stage flip-flops 61 and 62 may be considered as half of a conventional 1—2—4—8 binary coded decimal counter which counts to three by the following code:

| 1 | 2 | 4 | 8 | Count | Binary Output |
|---|---|---|---|-------|---------------|
| 0 | 0 | 0 | 0 | 0 | $\bar{1}$ $\bar{2}$—not 1 not 2 |
| 1 | 0 | 0 | 0 | 1 | 1 $\bar{2}$—true 1 not 2 |
| 0 | 1 | 0 | 0 | 2 | $\bar{1}$ 2—not 1 true 2 |
| 1 | 1 | 0 | 0 | 3 | 1 2—true 1 true 2 |

The weighing scale 10 (FIG. 1) has a capacity of 25.00 pounds. The price entry circuit 63 has a capacity of $9.99. The least significant place in the selected price per pound is multiplied by each place in the weight figure using the least significant place first, etc., with pulse entry of the partial products made into the register 72 which by partial products accumulation produces the final computed value figure. Then the procedure is repeated by multiplying the next place in the price per pound by each place in the weight figure and repeated again using the last place in the price per pound.

The decimal price entry is changed 1—2—4—8 binary coded decimal by a conventional encoder or diode matrix 73, e.g., a decimal nine in produces 1—8 binary output, and is applied to a coincidence circuit 74. The parallel 1—2—4—8 binary coded decimal weight output of the electrical readout 19 (FIG. 1) is applied to a coincidence circuit 75. At the start, with the clock 58 gated on and the counters 59 and 60 and the two-stage flip-flops 61 and 62 reset, price entry upsets coincidence between the price entry and he count in the counter 59 as detected by the coincidence circuit 74 and weight entry upsets coincidence between the weight entry and the count in the counter 60 as detected by the coincidence circuit 75. The two-stage flip-flop 61 in its reset state selects the cents place in he selected price per pound to be multiplied first and the two-stage flip-flop 62 in its reset state selects the hundredths place in the weight figure to be multiplied first.

The clock 58 has a gate terminal "G" to which the reset signal from the programmer 30 is applied through the lead 33 to gate on the clock and two output terminals 81 and 82. The clock 58 always starts negative putting such negative pulse on the terminal 81 while putting the positive portion of the pulse on the terminal 82. The two-stage flip-flop 61, which is identical to the one shown in FIG. 4 of the above U.S. Pat. No. 3,384,193, has four output leads identified by the numbers "1," "$\bar{2}$," "$\bar{1}$" and "2" just as are the four output leads shown in such FIG. 4 to produce binary outputs in accordance with the code set forth in the above table. At count zero, "$\bar{1}$" and "$\bar{2}$" outputs enable an AND gate 83; at count one, "1" and "$\bar{2}$" outputs enable an AND gate 84; and at count two, "$\bar{1}$" and "2" outputs enable an AND gate 85. The two-stage flip-flop 61 also has output, in and reset terminals "0," "IN" and "R," respectively. The two-stage flip-flop 62 also has four output leads identified by the numbers "$\bar{2}$," "2," "1," and "$\bar{1}$." At count zero, "$\bar{1}$" and "$\bar{2}$" outputs partially enable an AND gate 87; at count one, "1" and "$\bar{2}$" outputs partially enable an AND gate 88; at count two, "$\bar{1}$" and "2" outputs partially enable two AND gates 90 and 91; and at count three, "1" and "2" outputs partially enable AND gate 89. The two-stage flip-flop 62 also has output, in and reset terminals "0," "IN" and "R," respectively. The 1—2—4—8 binary counter 59 has in and reset terminals "IN" and "R," respectively. In the reset condition, the four output leads of the counter 59 apply four outputs to AND gates 92—95, respectively, to partially enable such gates. The 1—2—4—8 binary coded decimal counter 60 has in, reset and output terminals "IN," "R" and "0," respectively. In the reset condition, the four output leads of the counter 60 apply four outputs to AND gates 96—99, respectively, to partially enable such gates. At the same time, all outputs from the counter 60 are applied to an AND gate 100 to partially enable it.

Price entry is made in the price circuit 63 which includes a bank of 10 cents contacts 101 (only nine shown), a bank of 10 dimes contacts 102, and a bank of 10 dollars contacts 103 (only nine shown) which are closed by setting the price knobs or levers to selected positions. The contacts are in circuit with the respective ones of terminals 1—9 in the diode matrix 73. The AND gate 83 when enabled by the two-stage flip-flop 61 being in its reset state applies an output to a lead 104 (controls partial product gating hereinafter described) and to the bank of cents contacts 101; the AND gate 84 when enabled by the two-stage flip-flop 61 being in its count one state applies an output to lead 105 (controls partial product gating) and to the bank of dimes contacts 102; and the AND gate 85 when enabled by the two-stage flip-flop 61 being in its count two state applies an output to a lead 106 (controls partial product gating) and to the bank of dollars contacts 103. The leads 104—106 are connected to the partial product gating shown in FIG. 4.

The decimal price entry, e.g., a price of $1.12, would connect a closed contact in the bank 101 to the "2" terminal of the diode matrix 73, a closed contact in the bank 103 to the "1" terminal of the diode matrix 73, and a closed contact in the bank 103 to the "1" terminal of the diode matrix 73, is changed to 1—2—4—8 binary coded decimal by the diode matrix 73. It is to be remembered that only one bank of contacts is energized at a time as programmed by the two-stage flip-flop 61. When price contacts are closed, output terminals "1," "2," "4" and "8" of the diode matrix 73 apply inputs to the respective AND gates 92—95. For example, a decimal nine in produces a 1—8 binary output on output terminals "1" and "8" which is applied to AND gates 92 and 95.

Weight entry is made in the weight circuit 64 which includes four AND gates 111—114 which receive the hundredths place parallel 1—2—4—8 binary coded decimal output of the electrical readout 19 (FIG. 1), four AND gates 115—118 which receive the tenths place parallel 1—2—4—8 binary coded decimal weight output, four AND gates 119—122 which receive the units place weight output, and two AND gates 123—124 which receive the tens place weight output (25.00 pounds weighing scale capacity). The outputs of AND gates 11 and 115 are applied through OR gates 125 and 126 to the AND gate 99 and the output of the AND gate 119 is applied through OR gate 126 to the AND gate 99. The outputs of AND gates 112 and 116 are applied through OR gates 127 and 128 to the AND gate 98 and the output of the AND gate 120 is applied through the OR gate 128 to the AND gate 98. The outputs of AND gates 113 and 117 are applied through OR gates 129—131 to the AND gate 97, the outputs of AND gate 121 is applied through the OR gates 130 and 131 to the AND gate 97, and the output of the AND gate 123 is applied through the OR gate 131 to the AND gate 97. The output of the AND gates 114 and 118 are applied through OR gates 132—135 to the AND gate 96, the output of AND gate 122 is applied through the OR gates 133—135 to the AND gate 96, the output of AND gate 124 is applied through OR gates 134 and 135 to the AND gate 96, and the output of the AND gate 91 is applied through the OR gate 135 to the AND gate 96. The function of the AND circuit 91 is not to make weight entry but to make entry of a factor of one which is multiplied by the price entry for the purpose of storing price information in the register 72. The output of AND gate 87 partially enables AND gates 111—114, the output of AND gate 88 partially enables AND gates 115—118, the output of AND gate 90 partially enables AND gates 119—122, and the output of AND gate 89 partially enables AND gates 123 and 124. AND gates 87, 88, 90, 89 and 91 also apply their outputs to leads 136—140, respectively, which are connected to the partial product gating (FIG. 4) hereinafter described. Leads 138 and 140 are in circuit with the input of an OR gate 141.

At the start of a cycle the clock 58 is gated on and the counters 59 and 60, the two-stage flip-flops 61 and 62, and the register 72 are reset by the reset signal from the programmer 30 through the lead 33. At the count zero, the "$\overline{1}$" and "$\overline{2}$" outputs of the reset flip-flop 61 enable the AND gate 83 as described above to select the cents place in the price per pound to be multiplied first. Price entry is made as described above producing the 1—2—4—8 binary coded decimal output from the diode matrix 73. The coincidence circuit 74 includes the AND gates 92—95 and an OR gate 142. At count zero, the reset counter 59 has four outputs which partially enable the four AND gates 92—95. Price entry completely enables the respective ones of the AND gates 92—95 as described above and the outputs of the enabled AND gates 92—95 are applied to the OR gate 142 which in turn delivers an input to the AND gate 76. When this output from the OR gate 142 ceases, the change in state is used as an input to an AND gate 143. Price entry upsets coincidence between the price entry and the count in the counter 59 as detected by the coincidence circuit and clock pulses are passed by the AND gate 76 as long as coincidence does not exist, the AND gate 76 being enabled by the outputs of the OR gate 142 and the clock 58. As described above, decimal price entry in each "1—9" place in the price figure is made by closing selected ones of the contacts 101—103. No contacts are needed in multiplying price times weight for the "0" places in the price figure because coincidence already exists between the AND gates 92—95 and the count in the counter 59 (condition of circuit as shown with all of the contacts 101—103 open) when a "0" is selected to in effect multiply the weight entry by zero putting no pulses in the register 72 as the computer steps through its cycle.

At count zero, the "$\overline{1}$" and "$\overline{2}$" outputs of the reset two-stage flip-flop 62 partially enable the AND gate 87 which is completely enabled by a command to multiply weight times price on the lead 34 from the programmer 30. However, before this happens a command from the programmer 30 to multiply one times price is applied to the computer from the lead 35. Since multiplying one times price is done in the same manner as multiplying weight times price, for the sake of simplicity, the process will not be described except to note that at the beginning of the cycle when one is to multiplied by price the two-stage flip-flop 62 is in its count zero stage partially enabling the AND gate 87 which is not completely enabled because there is no input from the programmer 30 on the lead 34 resulting in zero being multiplied by price, then the two-stage flip-flop 62 is advanced to its count one state with the same result, then the two-stage flip-flop 62 is advanced to its count two state resulting in partial enabling of AND gates 90 and 91 with the same result as to AND gate 90, and then the two-stage flip-flop 62 is advanced to its count three state with the same result. The partially enabled AND gate 91 is completely enabled by the command to multiply one times price on the lead 35 and the output of the enabled AND gate 91 is applied to the lead 140 (controlling partial product gating hereinafter described) and to the OR gate 135 which applies an input to the AND gate 96, whereupon one is multiplied times price as hereinafter described in connection with a description of multiplying weight times price. The unit price figure is stored in the register 72 in the same manner as the computed value figure is stored in the register. The register 72 contains one series of counter stages for storing the unit price figure and another for storing the computed value figure. For the sake of simplicity, only one series of counter stages is shown in FIG. 4. However, as shown in FIG. 1, leads 42—45 extend from the price counter stages and leads 54—57 extend from the computed value counter stages. As above described, the readout 39 (FIG. 1) includes coincidence circuits 41 which receive 1—2—4—8 binary coded unit price signals from the computer 18 through leads 42—45, i.e., from one series of counter stages, and 1—2—4—8 binary coded decimal value signals through leads 54—57, i.e., from the other respective series of counter stages.

After the selected price figure has been stored in the register 72, the price entry is multiplied again but this time by the weight entry to obtain the computed value. First, the clock 58 is gated on and the counters 59 and 60, the two-stage flip-flops 61 and 62, and the register 72 are reset by the reset signal from the programmer 30 through the lead 33 and later the computer 18 receives the command to multiply weight times price on the lead 34 from the programmer 30 partially enabling AND gates 87, 88, 89 and 90. At count zero, the "$\overline{1}$" and "$\overline{2}$" outputs of the reset two-stage flip-flop 62 completely enable the partially enabled AND gate 87. The enabled AND gate 87 applies its output to the lead 136 (controlling partial product gating hereinafter described) and the inputs of AND gates 111—114 to select the hundredths place in the weight figure to be multiplied first. As above described, the hundredths place parallel 1—2—4—8 binary coded decimal output of the electrical readout 19 (FIG. 1), i.e., the weight entry, completely enables the respective ones of the AND gates 111—114 to in turn cause the respective AND gates 96—99 to be enabled, the four outputs from the reset counter 60 having already partially enabled such AND gates 96—99. The coincidence circuit 75 includes the AND gates 96—100, a NOT gate 144, and an OR gate 145. Weight entry completely enables the respective ones of the AND gates 96—99 as described above and the outputs of the enabled AND gates 96—99 are applied to the OR gate 145 which in turn delivers an input to an AND gate 146 partially enabling it. No weight entry for the "0" places in the weight figure is needed because coincidence already exists between the AND gates 96—99 and the count in the counter 60 before a weight entry is made to in effect multiply the price entry by zero putting no pulses in the register 72 as the computer steps through its cycle.

The negative pulse from the clock 58 also is applied to the NOT gate 144 which inverts the signal and applies it to the AND gate 100 which already is partially enabled by the four outputs of the reset counter 60 and the pulse from the clock 58 when it goes positive enables the OR gate 145 by way of a lead 147 if the OR gate 145 is not enabled already. The enabled AND gate 100 applies its output to an OR gate 149 having its output connected to the AND gate 146. The output of the AND gate 76 is connected to an input of the AND gate 77, the output of the AND gate 77 being connected to inputs of AND gates 150—153 of the partial product gating. The output of the AND gate 76 also is connected to the "IN" terminal of the counter 60.

The And gate 146 which is enabled by inputs from the OR gates 145 and 149 enables the partially enabled AND gate 77 which passes clock pulses to be counted by the register 72 and the AND gate 76 applies pulses to be counted to the counter 60. Accordingly, as long as the coincidence circuit detects a condition of no coincidence between the weight entry and the count in the counter 60 pulses pass to the register 72 and to the counter 60. That is, weight entry upsets coincidence. When the counter 60 reaches a state where the 1—2—4—8 coded output of the counter agrees with the 1—2—4—8 weight code set up on the AND gates 96—99, the respective counter outputs to the enabled ones of the AND gates 96—99 are cut off and such AND gates 96—99 are disabled and no outputs are applied by such AND GATES 96—99 to the OR gate 145 (coincidence). As soon as the next clock pulse starts going negative, this signal is applied to the OR gate 145 through the lead 147 to disable it which in turn causes the AND gate 146 to be disabled. This in turn causes the AND gate 77 connected to the disabled AND gate 146 to close cutting off pulses to the register 72. However, pulses still flow from the AND gate gate 76 to the counter 60 which resets on the tenth pulse and applies such tenth pulse to the "IN" terminal of the counter 59 to advance it.

The OR gate 149 is a holding circuit which keeps the AND gate 146 on until it loses its input from the OR gate 145 because the output of the AND gate 146 is applied to the OR gate 149 which has its output in turn connected to the input of the AND gate 146. The counter 60 counts as soon as it receives a pulse that is starting to go positive. The OR gate 145 drops out as far as it is enabled by the positive pulse from the clock 58 on lead 147 as soon as the pulse starts going negative. This delay after coincidence between the count in the counter 60 and the weight entry set up on the AND gates 96—99 has been attained ensures full pulse count by not closing the AND gate 77, which is connected to the OR gate 145 through the AND gate 146, until it is certain that the register 72 has received the last pulse to be counted. This prevents a clock pulse from being cut short by the AND gate 77 when it is disabled. When the counter 60 is reset (resets and applies four outputs to the AND gate 100 as soon as it receives the tenth positive pulse), the AND circuit 100 is disabled by a negative input signal applied to it by the NOT gate 144. This ensures that the tenth pulse is not counted by the register 72.

Reset of the counter 60 upsets coincidence between its count and the weight entry and the process is repeated until the counter 59 is advanced to a point where its 1—2—4—8 coded output agrees with the 1—2—4—8 code set up on the AND gates 92—95. The respective counter outputs to the enabled ones of the AND gates 92—95 are cut off and such AND gates 92—95 are disabled and no outputs are applied by such AND gates 92—95 to the OR gate 142 (coincidence). This means that, if the cents place in the price entry was a two and the hundredths place in the weight entry was a four, 8 pulses have been counted by the register 72, i.e., a partial product.

When coincidence circuit 74 (AND gates 92—95 and counter 59) detects coincidence, the output from the OR gate 142 changes sign and this input is applied to the AND gate 143 which already is enabled by the output from the clock 58. The enabled AND gate 143 enables an OR gate 155 and applies an advance signal on a lead 156 connected to the "IN" terminal of the two-stage flip-flop 62 to advance it to its count one state. An input of the OR gate 155 also is connected to the lead 33 on which reset signals are applied from the programmer 30. The enabled OR gate 155 resets both counters 59 and 60 by applying reset signals to terminals "R" of such counters. The two-stage flip-flop 62 in its count one state selects the tenths place in the weight figure to be multiplied next ("1" and "$\overline{2}$" outputs together with the command to compute signal on the lead 34 enable the AND gate 88). The cents place in the price entry now is multiplied by the tenths place in the weight figure as described above with pulse entry of the partial product in the register 72 which accumulates the partial products, and another output from the AND gate 143 resets the counters 59 and 60 and advanced the two-stage flip-flop 62 to its count two state.

The two-stage flip-flop 62 in its count two state selects the units place in the weight figure to be multiplied next ("$\overline{1}$" and "2" outputs together with the command to compute signal on the lead 34 enable the AND gate 90). The cents place in the price entry now is multiplied by the units place in the weight figure as described above with pulse entry of the partial product in the register 72 and another output from the AND gate 143 resets in the counters 59 and 60 and advances the two-stage flip-flop 62 to its count three state.

The two-state flip-flop 62 in its count three state selects the tenths place in the weight figure to be multiplied next ("1" and "2" outputs together with the command to compute signal on the lead 34 enable the AND gate 89). The cents place in the price entry now is multiplied by the tenths place in the weight figure as described above with pulse entry of the partial product into the register 72 and another output from the AND gate 143 resets the counters 59 and 60 and resets the two-stage flip-flop 62 to its count zero state which as it resets applies a pulse on the lead 80 to advance the two-stage flip-flop 61 to its count one state.

The two-stage flip-flop 61 in its count one state ("1" and "$\overline{2}$" outputs enable the AND gate 84) selects the dimes place in the price entry to be multiplied next. The above process is repeated until every place in the weight figure is multiplied by the dimes place in the price entry whereupon two-stage flip-flop 62 resets and applies a pulse on the lead 80 to advance the two-stage flip-flop 61 to its count two state.

The two-stage flip-flop 61 in its count two state ("$\overline{1}$" and "2" outputs enable the AND gate 85) selects the dollars place in the price entry to be multiplied next. The above process is repeated until every place in the weight figure is multiplied by the dollars place in the price entry, whereupon two-stage flip-flop 62 resets and applies a pulse on the lead 80 to advance the two-stage flip-flop 61 which then applies an output on the lead 36 to advance the programmer 30. The computed value now is stored in register 72.

As described above, the leads 104—106 are connected to partial product gating shown in FIG. 4 which includes 12 AND gates 157—168. The partial product gating also includes the AND gates 150—153 each of which have an input connected to the output of the AND gate 77. The other input of the AND gate 150 is connected to the lead 139; the other input of the AND gate 151 is connected to the output of the OR gate 141, the inputs of the OR gate 141 being connected to the leads 138 and 140; the other input of the AND gate 152 is connected to the lead 137; and the other input of the AND gate 153 is connected to the lead 136. The inputs of the AND gate 157 are connected to the lead 104 and to the output of the AND gate 153, respectively; the inputs of the AND gate 158 are connected to the lead 105 and to the output of the AND gate 153, respectively; the inputs of the AND gate 159 are connected to the output of the AND gate 153 and to the lead 106, respectively; the inputs of the AND gate 160 are connected to the lead 104 and to the output of the AND gate 152, respectively; the inputs of the AND gate 161 are connected to the lead 105 and to the output of the AND gate 152, respectively; the inputs of the AND gate 162 are connected to the lead 106 and to the output of the AND gate 152, respectively; the inputs of the AND gate 163 are connected to the lead 104 and to the output of the AND gate 151, respectively; the inputs of the AND gate 164 are connected to the lead 105 and to the output of the AND gate 151, respectively; the inputs of the AND gate 165 are connected to the output of the AND gate 151 and to the lead 106, respectively; the inputs of the AND gate 166 are connected to the lead 104 and to the output of the AND gate 150, respectively; the inputs of the AND gate 167 are connected to the lead 105 and to the output of the AND gate 150, respectively; and the inputs of the AND gate 168 are connected to the lead 106 and to the output of the AND gate 150, respectively.

The output of AND gate 157 is connected to the input of an OR gate 169; the output of AND gate 158 is connected to the input of an OR gate 170; the output of AND gate 159 is connected to the input of an OR gate 171; the output of the AND gate 160 is connected to the input of the OR gate 170; the output of the AND gate 161 is connected to an input of the OR gate 171; the output of the AND gate 162 is connected to an input of the OR gate 172; the output of the AND gate 163 is connected to an input of an OR gate 171; the output of the AND gate 164 is connected to an input of the OR gate 172; the output of the AND gate 165 is connected to an input of an OR gate 173; the output of the ANd gate 166 is connected to an input of the OR gate 172; and the output of the AND gate 167 is connected to an input of the OR gate 173.

The register 72 includes a series of counter stages that by partial product accumulation produces the final computed value figure. The register 72 includes six binary coded decimal counters 174—179 each like the counter 60 (FIG. 3). Each of the counters 174—179 includes input, reset and output terminals "IN," "R" and "0," respectively. The reset terminals "R" of the counters 174—179 are connected to the programmer reset lead 33. The "IN" terminal of the counter 174 is connected to the output of the OR gate 169 and the output terminal of the counter 174 is connected to an input of an OR gate 1880, a second input of the OR gate 180 being connected to the output of the OR gate 170. The input of the counter 175 is connected to the output of the OR gate 180 and the output of the counter 175 is connected to an input of an OR gate 181, a second input of the OR gate 181 being connected to the output of OR gate 171. The input of the counter 176 is connected to the output of the OR gate 181 and the output of the counter 176 is connected to an input of an OR gate 182, a second input of the OR gate 182 being connected to the output of the OR gate 172. The input of the counter 177 is connected to the output of the OR gate 182 and the output of the counter 177 is connected to an input of an OR gate 183, a second input of the OR gate 183 being connected to the output of the OR gate 173. The input of counter 178 is connected to the output of the OR gate 183 and the output of the counter of the counter 178 is connected to an input of an OR gate 184, a second input of the OR gate 184 being connected to the output of the AND gate 168. The input of counter 179 is connected to the output of the OR gate 184. The output of the OR gate 169 fills the counter 174 until the tenth pulse spills over to the counter 175 through the OR gate 180, the output of the OR gate 170 also helping to fill the counter 175 through the OR gate 180. In a similar manner, counters 176—179 are each filled from two sources.

Counters 174—179 accumulate the 0.0001, 0.001, 0.01, 0.1, 1.0 and 10.0 decimal places in the computed value, respectively. Counters 174 and 175 are not used in indicating the end result and thus the total computed value capacity is $99.99. That is, 0.0001+0.001+0.01+0.1+10.0 equals 11.1111. When the last two places are dropped, four places in the figure remain. Counter 175 could be preset with five counts in order to round off to the next higher cent. Counter 176—179 each puts a 1—2—4—8 binary coded decimal output on its four output leads one set of which is numbered 54—57 in FIG. 4 (Counter 179) and shown as the four leads 54—57 in FIG. 1. As above described, there are a commutator and a print wheel for each set of four output leads in the mechanical readout and printer 39 which are set up in accordance with the computed value count accumulated in the register 72. As also described above, there are a commutator and a print wheel for each set of four output leads 42—45 (FIG. 1) which are set up in accordance with the price count accumulated in the register 72.

When computing a value, the two-stage flip-flop 61 selects in sequence (other sequences can be used) the cents and dimes and dollars places in the price entry to be multiplied one at a time by enabling in sequence the AND gates 83—85 and also selects the proper gates in the partial product gating by such enabling in sequence the AND gates 83—85 which have their outputs connected to leads 104—106, respectively. The two-stage flip-flop 62 selects in sequence (other sequences can be used) the hundredths, tenths, units, and tens places in the weight entry to be multiplied one at a time by enabling in sequence the AND gates 87, 88, 90 and 89 and also selects the proper gates in the partial product gating by such enabling in sequence the AND gates 87, 88, 90 and 89 which have their outputs connected to leads 136—139. The outputs of the AND gates 87—90 partially enable the AND gates 150—153 (the output of AND gate 90 first enabling OR gate 141 which applies its output to the AND gate 151) which are enabled by clock pulses to be counted passing through the AND gate 77. Hence, the outputs of the price entry selection AND gates 83—85 and the outputs of the weight entry selection AND gates 150—153 enable the proper ones of the AND gates 157—168 to steer the clock pulses to the proper ones of the counters 174—179 so that the partial products are accumulated to the full computed value figure.

Taking as an example in which the counter 175 is not preset as described above, in multiplying $1.23 times 22.22 pounds which equals $27.33, as described above the two in the hundredths weight place is multiplied times the three in the cents place, then times the two in the dimes place, and then times the one in the one in the dollars place. This causes the output from the hundredths place AND gate 153 and he outputs in sequence on leads 104—106 to first enable AND gate 157, then AND gate 158, and then AND gate 159. The enabled AND gate 157 permits six pulses to be fed to counter 174 (two in the hundredths weight entry times three in the cents place), the enabled AND gate 158 permits four pluses to be fed to counter 175 (two in the hundredths weight entry times two in the dimes place), and the enabled AND gate 159 permits two pulses to be fed to counter 176 (two in the hundredths weight entry times one in the dollars place). Then, the two in the tenths weight place is multiplied times the three in the cents place, then times the two in the dimes place, and then times the one in the dollars place. This causes the output from the tenths place AND gate 152 and the outputs in the sequence on the leads 104—106 to enable AND gates 160, 161 and 162 in sequence. The enabled AND gates 160—162 permit six pulses to be fed to counter 175, four pulses to counter 176 and two pulses to counter 177. Similarly, multiplying the two in the units weight place times the three places in the price entry and then multiplying the two in the tens weight place times the three places in in the price entry causes partial products to accumulate in the counters 174—179.

In our example wherein $1.23 times 22.22 pounds equals $27.33, the partial products are entered and will accumulate to $27.3306 as shown in the following table:

| Counter 179 | Counter 178 | Counter 177 | Counter 176 | Counter 175 | Counter 174 |
|---|---|---|---|---|---|
| 10.0 | 1.0 | 0.1 | 0.01 | 0.001 | 0.0001 |
| | | | 2 pulses | 4 pulses | 6 pulses |
| | | 2 pulses | 4 pulses | 6 pulses | |
| | 2 pulses | 4 pulses | 6 pulses | | |
| 2 pulses | 4 pulses | 6 pulses | | | |
| $2 | 7 | 3 | 3 | 0 | 6 |

The price by quantity controls are added to the weighing scale system as an extra price option. In the system so far disclosed, printed tickets are issued each bearing the net weight, price per pound, and computed value of the weighed commodity together with such variable data as the date code, store or operator's code, commodity name, and commodity grade. When the price by quantity controls are incorporated in the system, weight or price per pound or computed value or all three can be blanked out (not printed) at will. Additionally, price by quantity is printed in the regular computed value areas on the labels when a price by quantity button is operated, the weight and price per pound areas on the labels being left blank. Price per pound or price by quantity is entered into the system through the same price entry circuit 63 (FIG. 2), the existing computer and programmer circuitry being used for either price-per-pound or price-by-quantity mode of operation.

Figure 5:
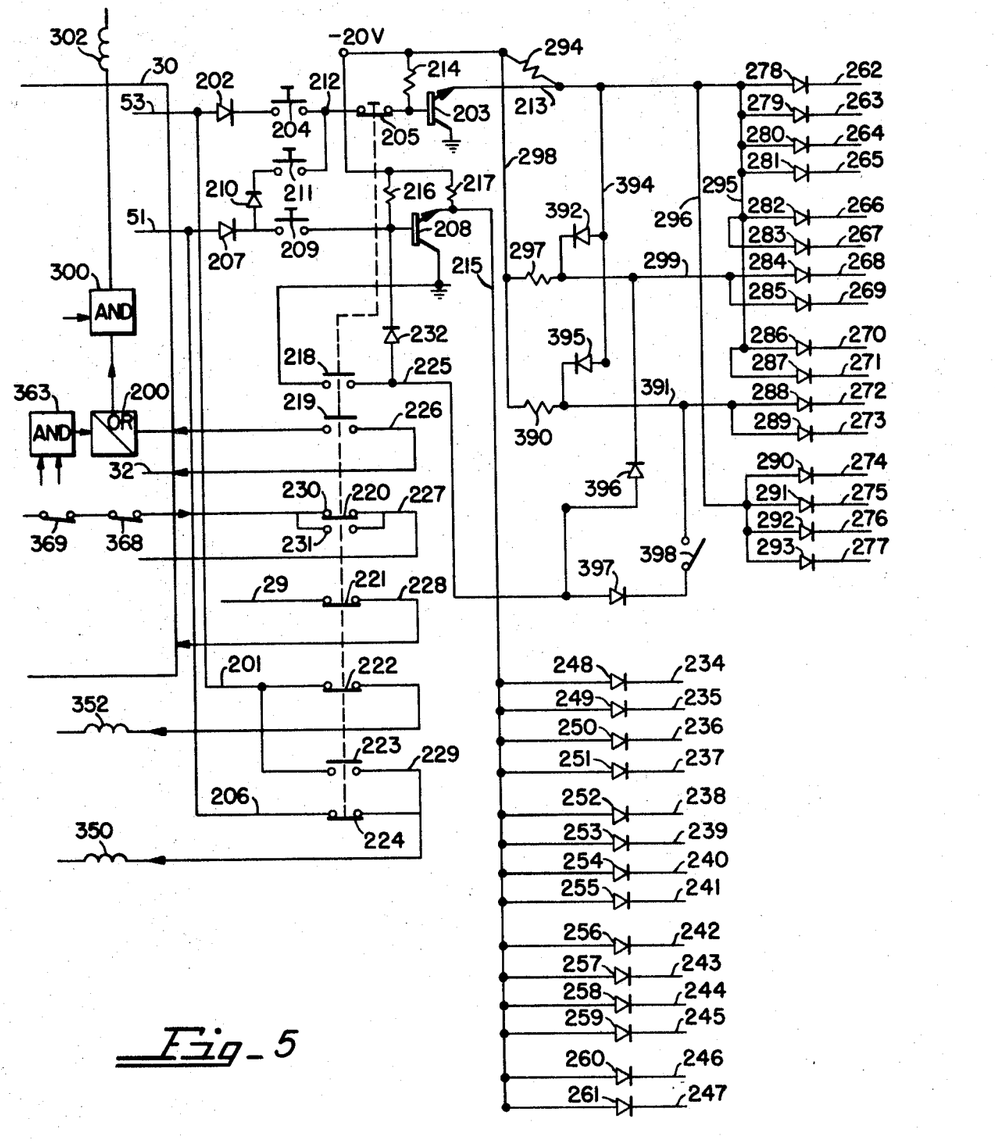
FIG. 5 is a block diagram of the controls of the invention combined with the system shown in FIG. 1.

The price by quantity controls are shown in FIG. 5. The programmer 30 which is shown as a block in FIG. 1 is shown fragmentarily in FIG. 5, the programmer 30 being disclosed in detail in the above U.S. Pat. No. 3,384,193. Enough of the programmer 30 is shown in FIG. 5 to show how the price by quantity controls are connected thereto. Leads 29, 32, 51 and 53 shown in FIG. 5 also are shown in FIG. 1; commodity name switch 368 and tare switch 369 shown in FIG. 5 correspond to switches 68 and 69, respectively, shown in FIG. 2 of U.S. Pat No. 3,384,193; and AND gates 300 and 363 and print solenoid coil 302 shown in FIG. 5 correspond to AND gates 100 and 63 and print solenoid coil 102, respectively, shown in FIG. 3 of U.S. Pat. No. 3,384,193. One addition is made to the programmer 30 when the price by quantity controls are attached, i.e., OR gate 200 is added and is connected to the output of AND gate 363 and to the input of AND gate 300 whereas in the programmer shown in U.S. Pat. No. 3,384,193 the output of AND gate 63 is connected directly to an input of AND gate 100.

The lead 53 is connected to the solenoid coil 352 in the mechanical readout 39 (FIG. 1), the connection being through a lead 201, and also is connected to a diode 202 which is connected in turn to an NPN transistor 203 through contacts 204 and 205. The lead 51 is connected to the solenoid coil 350 in the mechanical readout 39, the connection being through a lead 206, and also is connected to a diode 207 which is connected in turn to an NPN transistor 208 through contacts 209. Diode 207 also is connected through a diode 210 and contacts 211 to a point 212 in the circuit between the contacts 204 and the contacts 205. Transistor 203 has its emitter connected to a lead 213, its base connected to the contacts 205 and through a resistor 214 to a minus 20 volts power supply, and its collector connected to ground. Transistor 208 has its emitter connected to a lead 215, its base connected to the contact 209 and through a resistor 216 to the minus 20 volts power supply, and its collector connected to ground. The lead 215 is connected through a resistor 217 to the minus 20 volts power supply. Contacts 205 are mechanically ganged to move together as one with contacts 218—224 in leads 225—228, the lead 201, a lead 229, and the lead 206, respectively. Contacts 220 are double contacts so that the circuit through the lead 227 is broken only momentarily as the contacts move from one set of terminals 230 to the other set of terminals 231. A diode 232 is connected between the lead 225 and the base of the transistor 208.

The price by quantity controls are connected to the 14 weight readout leads 233 (FIG. 1) by connecting leads 234—247 to such leads 233, leads 235—247 being connected to the emitter of the transistor 208 through the lead 215. Diodes 248—261 in the leads 234—247, respectively, prevent signals from the electrical readout 19 (FIG. 1) from feeding back into the price by quantity control circuit (FIG. 5). The coincidence circuits 41 receive 1—2—4—8 binary coded decimal weight signals from the electrical readout 19 just as they receive the unit price signals and computed value signals on leads 42—45 and 54—57, respectively, and 1—2—4—8 binary coded decimal signals through leads not shown indicative of the positions of the weight commutators in the mechanical readout.

The price by quantity controls are connected to the register counters 176—179 by connecting leads 262—265 to the output leads 54—57 of counter 179 (FIG. 4), by connecting leads 266—269 to the output leads of counter 178, by connecting leads 270—273 to the output leads of counter 177, and by connecting leads 274—277 to the output leads of counter 176. The register 72 contains one series of counter stages (not shown) for storing the price figure and another identical series as shown in FIG. 4 for storing the computed value FIG. Leads 42—45 extend from the price counter stages (FIG. 1) and leads 54—57 extend from the computed value counter stages. Leads 262—277 in addition to being connected to the computed value counter stages as shown also are connected to the corresponding price counter stages. Suitable switches (not shown) are so mechanically connected to the pushbutton contacts 204 and 211 that blanking out price per pound printing can be accomplished without blanking out computed value printing and vice versa. Diodes 278—293 in the leads 262—277, respectively, prevent signals from the counters from feeding back into the price by quantity control circuit. Lead 213, which is connected to the emitter of the transistor 203, also is connected to the minus 20 volts power supply through a resistor 294. Diodes 278—283 and 286—287 are connected through a lead 295 to the lead 213 and, hence, to the power supply. Diodes 290—293 are connected through a lead 296 to the lead 213, and, hence, to the power supply. Diodes 284 and 285 are connected the power supply through a resistor 297, the resistor 297 a lead 298 connected to the power supply to a lead 299 connected to the diodes 284—285. Diodes 288 and 299 are connected to the power supply through a resistor 390, the resistor 390 joining the lead 298 to a lead 391 connected to the diodes 288—289. A diode 392 is connected between the resistor 297 and a lead 394 which connects the lead 213 to a diode 395 which is connected in turn to the resistor 390. A diode 396 is connected between the leads 225 and 299, and a diode 397 is located in the lead 225 before a switch 398 which when it is closed connects the diode 397 to the lead 391. Switch 398 is mechanically connected to close or open with the closing or opening of the zero position of the bank of 10 dimes contacts 102 (FIG. 2).

The gating for the price counter stages is altered when the price by quantity control is added to the system. The computer circuit can be used exactly as shown in FIGS. 2—4 with only the one series of counter stages and its gating setting up both the price and computed value print wheels when the multiplexing circuit disclosed in U.S. Pat. application Ser. No. 446,274 filed Apr. 7, 1965 in the name of W. C. Susor is incorporated in the system. When the multiplexing circuit is used, 1—2—4—8 binary coded decimal unit price signals are put on the leads 42—45 (FIG. 1 and also FIG. 1 in the above U.S. application Ser. No. 446,274) from the counter shown in FIG. 4 to set up the respective mechanical readout module for unit price printing and thereafter in the program 1—2—4—8 binary coded decimal computed value signals are put on the same leads 42—45 from the same counter to set up the respective mechanical readout module for computed value printing. When two series of counters are used and when in the price-per-pound mode, the price counters (counter output leads 42—45—FIG. 1) set up the price print wheels and the computed valve counters (counter output leads 54—57—FIG. 1) set up the computed value print wheels, and in the price-by-quantity mode, the price counters (counter output leads 42—

45) are switched over as indicated in FIG. 1 and as described hereinafter to set up the computed value print wheels, the price print wheels being set up in blank printing positions. Hence, price by quantity is printed in the usual computed value areas on the tickets, labels or the like.

The alteration to the gating circuitry shown in FIG. 4 consists in adding an OR gate 399 having its output connected to the input of the OR gate 184 and by adding an AND gate 400 having its output connected to the input of the OR gate 399. The inputs of the AND gate 400 are connected to the output of the AND gate 151 and to a lead 401, respectively, the lead 401 being connected to the lead 106 through contacts 402. Contacts 402 move together as one with contacts 403, which are added in the lead 106, and with contacts 205, 218, 219, 220, 221, 222, 223 and 224 (FIG. 5).

When pushbutton contacts 204, 209, and 211 are open and pushbutton contacts 205 (FIG. 5) are closed (contacts 218, 219, 220 at terminals 231, 223, and 402—FIG. 4 open, contacts 220 at terminals 230, 221, 222, 224 and 403—FIG. 4 closed, contacts 404—411—FIG. 1 closed and contacts 416—419—FIG. 1 open), the system issues printed tickets bearing among the information mentioned above price per pound, i.e., the system operates as though the price by quantity control circuit (FIG. 5) did not exist. In this mode of operation, price per pound or computed value or weight printing or all three can be blanked out at will by closing contacts 204 or 211 or 209. In the contact positions shown in FIG. 5, transistor 203 is off and the minus 20 volts from the voltage supply is applied through the resistor 294 and the lead 295 to the diodes 278—283 and 286—287, through the resistor 294 and the lead 296 to the diodes 290—293, through the resistor 297 and the lead 299 to the diodes 284—285, and through the resistor 390 and the lead 391 to the diodes 288—289. Hence, diodes 278—293 are off. Transistor 203 is turned on (on because its base is more positive than its emitter) by closing contacts 204 and/or 211 which applies the ground connected to its collector to diodes 278—293, i.e., the closing of the contacts applies signals to all of the diodes 278—293. Diodes 278—293 are connected through the leads 262— 277 to the output leads of the price counters and to the computed value counters 176—179 (FIG. 4) which when contacts 211 are closed apply 1—2—4—8 binary coded decimal signals to the coincidence circuits 41 (each of the counters 176—179 has an output of 1+2+48=15). As described in the above U.s. Pat. No. 3,416,151, the mechanical readout 39 includes a combination of a series of modules each comprising a detent wheel which is directly gear connected to a commutator and to a print wheel. Each module indicates the digits of a particular denominational order, and each print wheel has 12 positions as described in the above U.S. Pat. No. 3,416,151. In one of the 12 positions, each of the print wheels is blank (no printing type) and the output of 15 from each of the counters 176**causes the four computed value print wheels to stop in their blank printing positions and the output of 15 from each of the price counters causes the price print wheels to stop in their blank printing positions.

In the same manner, weight printing is blanked out by closing contacts 209 in circuit with the diode 207 that receives the above signal from the programmer lead 51. Transistor 208 is turned on by closing contacts 209 which applies the ground connected to its collector to diodes 248—261, i.e., the closing of contacts 209 applies signals to all of the diodes 248—261. Diodes 248—261 are connected through the leads 234—247 to the weight output leads 233 of the electrical readout 19 (FIG. 1) which apply 1—2—4—8 binary coded decimal signals to the coincidence circuits 41. There is a print wheel for each of the four sets of output leads 233 and the output of 15 on three of the four sets of output leads causes three of the four weight print wheels to stop in the blank printing positions. One of the four weight print wheels only prints a one or a two because the capacity of the system is only 25.00 pounds and, accordingly, this weight print wheel is arranged to stop in a blank position when its respective set of two output leads 233 has an output of three.

After putting the system through one cycle with contacts 204, 209 and 211 closed to set up the 12 price, value and weight print wheels in blank printing positions, pushbutton contacts 205 are opened (ganged contacts 218 and 219 close, 220 open at terminals 230 and close at terminals 231, 221 and 222 open, 223 close, 224 open, 402—FIG. 4 close, 403—FIG. 4 open, contacts 404—411—FIG. 1 open and contacts 416—419—FIG. 1 close) to print price by quantity in the regular computed value areas on the tickets, labels or the like.

In operation, price by quantity is entered in the price entry circuit 63 in the same manner as price per pound is entered. In the price-per-pound mode, if contacts 103—101 are set at 1, 2 and 3, respectively, $1.23 will be printed in the unit price areas on the labels. In the price-by-quantity printing mode, if contacts 103—101 are set at 1, 2 and 3, respectively, one twenty-third (one piece for 23 cents or 1 pound for 23 cents) will be printed in the regular computed value areas on the labels. Decimal price entry in each "1—9" place in the price figure is made by closing selected ones of the contacts 101—103. No contacts are needed in multiplying price times weight for the "0" places in the price figure because coincidence already exists between the AND gates 92—95 and the count in the counter 59 when a "0" is selected. However, a special case exists when it is desired to print, for example, three one-hundredths in the price-by-quantity mode, because there are only four print wheels to print the four numbers plus the slant line. In this special case, the print wheel which is controlled by the price counter which corresponds to value counter 177 prints a 10 when the counter has an output of 12. The counter 177 has an output of 12 when the system is in the price-by-quantity mode and when the zero position of the bank of 10 dimes contacts 102 (FIG. 2) is made closing switch 398 (FIG. 5) mechanically connected to close or open with the closing or opening of the zero position of the bank of 10 dimes contacts 102. To print three one-hundredths, the "3" contact in the dollars contacts 103 is closed, the "0" contact, i.e., the 10 contact in the dimes contacts 102 is closed, and the "0" contact (not shown) in the cents contacts 101 is closed. The counter 177 has an output of 12 when contacts 398 (FIG. 5) are closed because the closing of contact 218 puts ground potential on the diode 397 which is transmitted as a signal through the closed contacts 398 and lead 391 to diodes 288 and 289 which are connected by leads 272 and 273 to counter 177. The print wheel which is set up by a counter output of 12 carries a 10 printing type in this respective position.

There are 12 print wheels, four for price printing, four for value printing, and four for weight printing. All of the print wheels have 12 printing positions. The price print wheels print 0—9 and carry a blank. The value print wheels which print computed value in the price-per-pound mode or price by quantity in the price-by-quantity mode, print 0—9 and carry a blank and additionally the print wheel which is controlled by the price counter that corresponds to the value counter 178 prints a slant line at a counter output of 12. In the special case of printing, for example, three one-hundredths, the print wheel controlled by the price counter which corresponds to the value counter 177 prints a 10 at a counter output of 12. The four weight print wheels print 0—9 and carry a blank.

The print wheel controlled by the price counter which corresponds to the value counter 178 prints a slant line at a counter output of 12. This is achieved by putting ground potential on the diode 396 by closing the contacts 218 (ground potential applied to diode 396 through lead 225). This applies a signal from diode 396 through the lead 299 to diodes 284 and 285 which are connected by leads 268 and 269 to two of the outputs of counter 178.

To continue with the operation, contacts 204, 209 and 211 are closed and the system is cycled once to set up the 12 print wheels in blank printing position, pushbutton contacts 205 shown in FIGS. 4 and 5 as indicated in such figures), and price by quantity, e.g., 3 for 59 cents ("3" contact in contacts 103 closed, "5" contact in contacts 102 closed and "9" contact in contacts 101 closed) is entered in the price entry circuit 63. The programmer 30 automatically puts the system through the cycle and tickets, labels or the like are printed with three fifty-ninths in the regular computed value areas and the regular unit price and weight areas are left blank.

Putting the system in the price-by-quantity mode momentarily breaks the circuit in lead 227 at contact terminals 230 and recompletes the circuit in lead 227 at the contact terminals 231. Lead 227 is connected through the contacts 220 to the tare and commodity name interlock switches 369 and 368 and connects the switches 369 and 368 into the rest of the programmer 30 just as the corresponding tare and commodity name interlock switches 69 and 68 shown in the above U.S. Pat. No. 3,384,193 are connected to the rest of the programmer so that change in tare or commodity plate setting interrupts the cycle of operations in the normal manner. Contacts 220 are provided so that change from price-per-pound mode to price-by-quantity mode or vice versa momentarily breaks the circuit in lead 227 to interrupt the cycle of operations. The start switch shown in U.S. Pat. No. 3,384,193 must be operated to make the system go. Accordingly, contacts 220 are an interlock to remind the operator of the change in mode.

Putting the system in the price-by-quantity mode opens contacts 221 in lead 228 which connects the lead 29 (FIGS. 1 and 5) from the motion detector 27 to the programmer 30. This prevents no motion signals from being given to the programmer 30.

In the price-by-quantity mode, contacts 205 are open so that signals from programmer lead 53 do not affect the transistor 203 and contacts 218 are closed to put diode 232 at ground potential for the purpose of turning transistor 208 on. This automatically blanks out weight printing. Closing contacts 218 also puts diodes 396 and 397 at ground potential. As above described, diode 396 being at ground potential applies a signal to diodes 284 and 285 for the purpose of putting an output of 12 on the output leads of counter 178 whereupon the print wheel controlled by the price counter which corresponds to value counter 178 prints a slant line. As above described, diode 397 being at ground potential applies a signal to diodes 288 and 289 through closed contacts 398 (closed when the dime price contacts 102—FIG. 2 are in "0" position) for the purpose of putting an output of 12 on the output leads of counter 177 whereupon the print wheel controlled by the price counter which corresponds to value counter 177 prints a 10.

In the price-per-pound mode, contacts 402 (FIG. 4) are open and contacts 403 are closed. When computing price per pound by multiplying the price entry by one, the two-stage flip-flop 61 (FIG. 2) selects the proper gates in the partial product gating (FIG. 4) by enabling in sequence the AND gates 83—85 (FIG. 2) which have their outputs connected to leads 104—106, respectively. In the price-by-quantity mode, the price counter which corresponds to value counter 178 controls the printing of the slant line and, accordingly, it is necessary to take the control of counter 178 away from lead 106 connecting the output of AND gate 85 (FIG. 2) to the partial product gating and put it under the control of lead 401 (FIG. 4) by opening contacts 403 in lead 106 and closing contacts 402 in lead 401.

The function of the AND circuit 91 (FIG. 3) is to make entry of a factor of one which is multiplied by the price entry, whether price per pound or price by quantity, for the purpose of storing price information in the register 72 (FIG. 4). The AND gate 91 is partially enabled during the multiplying cycle by the two-stage flip-flop 62 and is completely enabled by the command to multiply one times price on the lead 35. The output of the enabled AND gate 91 is applied to the OR gate 141 through the lead 140). The output of the OR gate 141 is applied as an input to the AND gate 151 (FIG. 4) which is completely enabled by clock pulses to be counted passing through the AND gate 77. The output of the AND gate 151 is applied as an input to the AND gate 400 which is completely enabled by a signal on the lead 401 from the AND gate 85 (FIG. 2) indicating that the dollars place in the price entry is being multiplied by one. The output of the AND gate 400 is applied as an input to the OR gate 399 which has its output connected to an input of the OR gate 184. The clock pulses (dollar price entry times one) pass through the open gates 151, 400, 399 and 184 into the counter 179. The computer 18 multiplies, when in the price-per-pound mode, unit price times one so that it can produce a unit price output. A price entry of $3.59 when multiplied in the price-per-pound mode by one puts a count of 3 in counter 178, a count of 5 in counter 177 and a count of 9 in counter 176. When in the price-by-quantity mode, the computer 18 multiples the price entry times one and puts the tenths and hundredths places in the counters 177 and 176 as usual but puts the units place in the counter 179 instead of in the counter 178 because the price counter which corresponds to the value counter 178 is used to set up the slant line in printing, for example, three fifty-ninths.

In the price-by-quantity mode, contacts 222 and 224 (FIG. 5) are open and contacts 223 are closed. When the programmer 30 puts signals on the leads 51 and 53 which in the price-per-pound mode energized solenoid coils 350 and 352, in the price-by-quantity mode the open contacts 222 prevent energization of unlock solenoid coil 352 (unit price print wheels remain locked in blank position). However, the closed contacts 223 permit the signal on the lead 53 to energize the solenoid coil 350 for a new setup of the computed value print wheels to the selected price-by-quantity figure. At the same time, the closing of contacts 219 puts a signal on the lead 32 which is connected to a ready lamp (not shown) in the programmer and gives an input to the OR gate 200 having its output connected to the AND gate 300 to enable the AND gate 300 provided it has been partially enabled by the operator removing the previously printed label as described in the above U.S. Pat. No. 3,384,193. The enabled AND gate 300 applies an input signal to the print solenoid 302 in the mechanical readout and printer 39 and the ticket, label or the like is printed.

Sixteen computer price information output leads of which only four leads 42—45 are shown in FIG. 1 are connected to the coincidence circuits 41. Switches 404—407 in leads 42—45, respectively, which are mechanically connected to switch 205 (FIG. 5) are closed in the price-per-pound mode. Sixteen computer computed value output leads of which only four leads 54—57 are shown in FIG. 1 also are connected to the coincidence circuits 41. Switches 408—411 in leads 54—57, respectively, which are mechanically connected to switch 205 (FIG. 5) are closed in the price-per-pound mode. Lead 412 connects lead 45 to lead 57; lead 413 connects lead 44 to lead 56; lead 414 connects lead 43 to lead 55; lead 415 connects lead 42 to lead 54. Switches 416—419 are in leads 412—415, respectively, are mechanically connected to switch 205 (FIG. 5) and are open in the price-per-pound mode. Accordingly, switches 404—407, 408—411 and 416—419 are so positioned that in the price-per-pound mode they do not affect the regular control of the computer 18 over the coincidence circuits 41 and are provided so that in the price-by-quantity mode the price is printed in the computed value areas on the tickets, labels or the like.

In the price-by-quantity mode, switches 404—411 are open and switches 416—419 are closed. The price count in the price counters is then transferred to the output leads of the computed value counters (price information leads 42—45 connected to computed value leads 54—57, respectively). Accordingly, the regular computed value print wheels are set up in accordance with the information in the price counters when the system is set in the price-by-quantity mode.

It is to be understood that the above description is illustrative of this invention and that various modifications thereof can be utilized without departing from its spirit and scope.

Having described the invention, I claim:

1. A computing and printing weighing scale system comprising, in combination, a computer, means for entering a weight factor in the computer, means for entering a price per weight unit factor or a price by quantity figure in the computer, the computer including means for producing electrical outputs in accordance with the product of said factors or in accordance with said figure, means electrically connected to the computer for printing said product or said figure, and programmer means including switch means having three settings, the programmer means in the first switch setting programming the system to weigh and compute and print said product, the second switch setting producing electrical signals for setting the printing means to blank printing positions as programmed by the programmer means, and the programmer means in the third switch setting programming the system to produce said electrical output in accordance with said figure and print said figure.

2. A system according to claim 1 wherein the programmer means includes interlock means responsive to change in said third switch setting for interrupting the program.

3. A system according to claim 1 wherein the product and the figure are printed in the same relative places on records.

4. A system according to claim 1 wherein at least part of the means for entering the factor or the figure in the computer is common to both entries.

5. In a system having a price per weight unit mode cycle for computing and printing records of the values of weighed loads and a price by quantity mode cycle for printing records of price by quantity entries, in combination, weighing mechanism, computer means for computing the value of each weighed load in the price per weight unit mode and for producing electrical outputs in accordance with the price by quantity entries, means for making weight information provided by the weighing mechanism available to the computer means, readout means connected to the computer means including printer means for printing the record of the computed value in the price per weight unit mode and for printing the record of the price by quantity entry in the price by quantity mode, the computed value and the price by quantity entry being printed in the same relative places on the records, and programmer means for programming the system.

6. In a system having a price per weight unit mode cycle for computing and printing records of the values of weighed loads and a price by quantity mode cycle for printing records of price by quantity entries, in combination, weighing mechanism, computer means for computing the value of each weighed load in the price per weight unit mode and for producing electrical outputs in accordance with the price by quantity entries, means for entering a price per weight unit factor or a price by quantity figure in the computer means, at least part of the means for entering the factor or the figure in the computer means being common to both entries, means for making weight information provided by the weighing mechanism available to the computer means, readout means connected to the computer means including printer means for printing the record of the computed value in the price per weight unit mode and for printing the record of the price by quantity entry in the price by quantity mode, and programmer means for programming the system.

7. A computing and printing weighing scale system comprising, in combination, a computer, means for entering a weight factor in the computer, means for entering a price per weight unit factor or a price by quantity figure in the computer, the computer including means for producing electrical outputs in accordance with the product of said factors or in accordance with said figure, means electrically connected to the computer for printing said product or said figure, and programmer means operable in a first mode for programming the system to weigh and compute and print said product and operable in a second mode for programming the system to produce said electrical output in accordance with said figure and print said figure.

UNITED STATES PATENT OFFICE
CERTIFICATE OF CORRECTION

Patent No. 3,584,204　　　　　　　　　Dated　June 8, 1971

Inventor(s)　William C. Susor

It is certified that error appears in the above-identified patent and that said Letters Patent are hereby corrected as shown below:

Column 4, line 5, after "changed" insert --to--; line 13, "he" should read --the--; line 18, "he" should read --the--. Column 5, line 1, "103" should read --102--; line 21, "11" should read --111--. Column 6, line 17, after "to" insert --be--; line 61, after "and" insert --to--. Column 7, line 21, "And" should read --AND--; line 29, before "counter 60" insert --count in the--. Column 8, line 22, "advanced" should read --advances--; line 31, delete "in"; line 33, "three" should read --two--. Column 9, line 32, "ANd" should read --AND--; line 45, "1880" should read --180--; line 59, delete "of the counter" first occurrence. Column 10, line 1, "0.0001+0.001+0.01+0.1+10.0" should read --0.0001+0.001+0.01+0.1+1.0+10.0--; line 45, delete "in the one"; line 46, "he" should read --the--. Column 11, line 8, after "7" insert a period. Column 12, line 1, "235" should read --234--; line 38, after "connected" insert --to--; line 39, after "297" insert --joining--. Column 13, line 44, "1 + 2 +48 = 15" should read --1 + 2 + 4 + 8 = 15--; line 53, "176**" should read --176-179--.

Column 14, line 69, after "205" insert -- are opened (repositioning the contacts ganged with contacts 205 --. Column 16, line 19, "energized" should read -- energizes --.

Signed and sealed this 11th day of April 1972.

(SEAL)
Attest:

EDWARD M. FLETCHER, JR.　　　　　　ROBERT GOTTSCHALK
Attesting Officer　　　　　　　　　　Commissioner of Patents